US012173756B1

(12) United States Patent
Colombo

(10) Patent No.: US 12,173,756 B1
(45) Date of Patent: Dec. 24, 2024

(54) CLUTCH SYSTEM WITH A DETENT ASSEMBLY

(71) Applicant: DANA GRAZIANO S.R.L., Turin (IT)

(72) Inventor: Silvano Colombo, Rivoli (IT)

(73) Assignee: DANA GRAZIANO S.R.L., Rivoli (IT)

( * ) Notice: Subject to any disclaimer, the term of this patent is extended or adjusted under 35 U.S.C. 154(b) by 0 days.

(21) Appl. No.: 18/360,691

(22) Filed: Jul. 27, 2023

(51) Int. Cl.
*F16D 11/14* (2006.01)
*F16D 23/14* (2006.01)
*F16D 11/00* (2006.01)

(52) U.S. Cl.
CPC ............... *F16D 11/14* (2013.01); *F16D 23/14* (2013.01); *F16D 2011/006* (2013.01)

(58) Field of Classification Search
CPC ...... F16H 2700/00; F16D 1/033; F16D 41/00; F16D 2011/006; F16D 2023/14; F16D 2011/002
See application file for complete search history.

(56) References Cited

U.S. PATENT DOCUMENTS

| | | | | |
|---|---|---|---|---|
| 2,221,894 A | * | 11/1940 | White | F16D 23/06 192/53.341 |
| 2,574,004 A | * | 11/1951 | Zingsheim | F16D 23/08 192/81 C |
| 3,086,633 A | * | 4/1963 | Winter | F16D 23/06 192/48.91 |
| 4,569,247 A | | 2/1986 | Inui et al. | |
| 4,712,662 A | * | 12/1987 | Elverdam | F16D 23/06 192/53.341 |
| 5,887,688 A | * | 3/1999 | Ploetz | F16D 23/06 192/53.341 |
| 6,161,964 A | | 12/2000 | Fukao | |
| 8,858,387 B2 | | 10/2014 | Haupt et al. | |

* cited by examiner

*Primary Examiner* — Stacey A Fluhart
(74) *Attorney, Agent, or Firm* — McCoy Russell LLP

(57) ABSTRACT

Methods and systems are provided for a clutch assembly. The clutch assembly includes, in one example, a sleeve that is configured to at least partially circumferentially surrounds a hub a detent assembly positioned in the hub and configured to hold the sleeve and the hub in a defined axial position. The detent assembly includes an opening with a ball and a spring positioned therein and a retaining device that maintains the spring and the ball in the opening, where the ball mates with a detent in the sleeve.

16 Claims, 6 Drawing Sheets

CLUTCH SYSTEM WITH A DETENT ASSEMBLY

TECHNICAL FIELD

The present description relates generally to a detent system for a clutch assembly. More specifically, the present disclosure relates to a detent system with balls and springs retained in an opening of a hub via a retaining device.

BACKGROUND AND SUMMARY

Vehicles may include a transmission for adjusting the rotational speed in relation to the transmission's input and output. Some transmissions have a multi-speed design where discrete gear ratios are engaged and disengaged using clutches to alter the transmission's input to output speed adjustment. Some clutches include hubs, sleeves, and components that constrain movement between the hub and the sleeve.

The Applicant has recognized several issues with previous clutch assemblies. For instance, some previous clutches demand the sequential installation of separate clutch components on a shaft. This clutch installation sequence may be comparatively slow, laborious, and prone to improper or incomplete clutch installation due to component misplacement or loss, in some cases.

The issues described above may be addressed by a clutch assembly. The clutch assembly includes, in on example, a sleeve that is configured to at least partially circumferentially surrounds a hub. The clutch assembly further includes a detent assembly positioned in the hub and configured to hold the sleeve and the hub in a defined axial position. The detent assembly includes an opening with a ball and a spring positioned therein and a retaining device that maintains the spring and the ball in the opening. In the clutch assembly, the ball mates with a detent in the sleeve. Designing the clutch assembly in this manner allows at least a portion of the clutch to be pre-assembled and then subsequently efficiently installed on a shaft as an assembled unit, if desired. Consequently, the likelihood of improper clutch installation and component misplacement and loss is reduced, thereby increasing manufacturing efficiency and confidence.

Further, in one example, the retaining device may be a circlip. In such an example, the circlip may include a tab that constrains (e.g., prevents) rotation of the circlip and the tab may mate with a second opening, in some instances. In this way, the ball and spring are confidently and effectively retained in the hub opening. Further, in one example, the opening is a through hole. Using a through hole allows the manufacturing and installation of the assembly to be further simplified.

Further, in one example, the retaining device may be a bushing. Using a bushing in the clutch assembly allows the spring and the ball to be confidently retained in the opening, further decreasing the likelihood of the ball and spring becoming decoupled from their intended positions in the hub opening.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
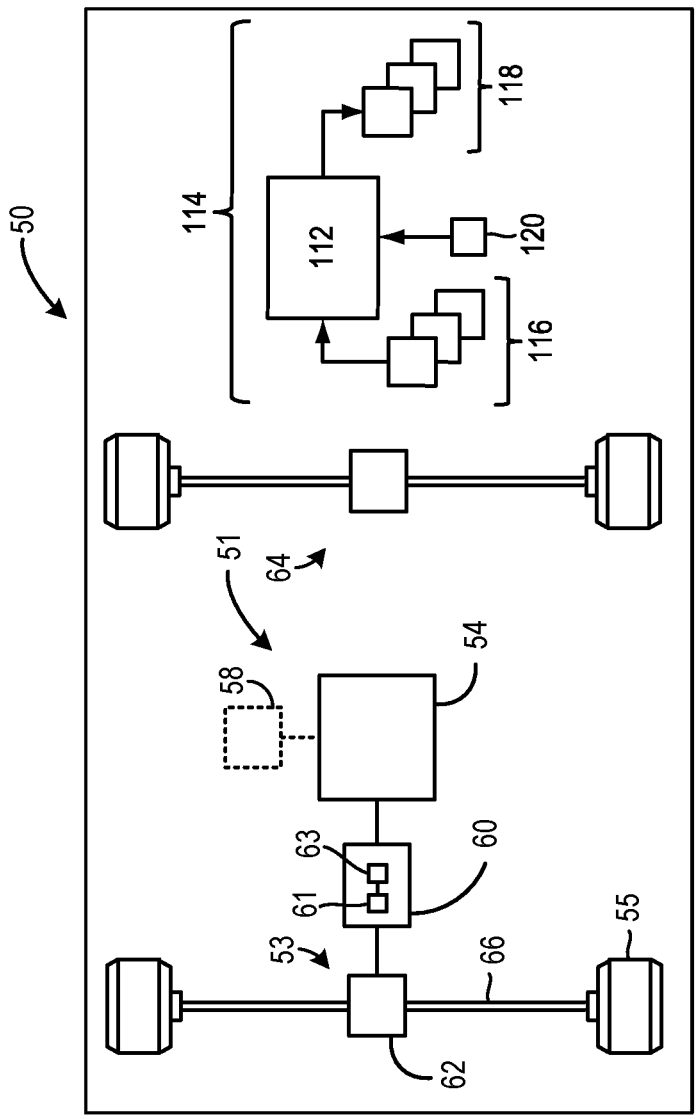
FIG. 1 shows an example of a vehicle system with a transmission.
Figure 1:

FIG. 1 shows a schematic depiction of a vehicle 50 with a powertrain 51 that may include a prime mover 54 and a transmission 60 (e.g., a gearbox). In some examples, the prime mover 54 may be an electric motor (e.g., a traction motor). In such an example, the electric motor may be electrically connected to an energy storage device 58 (e.g., one or more traction batteries, capacitors, fuel cells, combinations thereof, and the like). Further, in the electric motor example, the motor may be configured to operate as a generator, during selected conditions, to provide electrical power to charge the energy storage device 58, for example. In such an example, the powertrain may include an inverter that is electrically coupled to the energy storage device and the traction motor. In other examples, the prime mover 54 may be an internal combustion engine. Therefore, the vehicle 50 may be a hybrid electric vehicle, an all-electric vehicle, or an internal combustion engine vehicle, in different examples.

In the illustrated example, the transmission 60 delivers mechanical power to a differential 62 of an axle assembly 53. However, it will be appreciated that the transmission 60 may additionally or alternatively deliver mechanical power to another axle assembly 64 in the vehicle 50, in other examples. Still further, in other examples, the transmission may be incorporated into one of the axles to form an electric axle assembly. In one specific example, the vehicle may be a hybrid electric vehicle which includes one electric drive axle and another axle which is driven by an internal combustion engine. However, powertrains with a variety of architectures have been envisioned.

The transmission 60 may be configured to receive torque from the prime mover 54 via a shaft (e.g., a drive shaft) and/or other suitable mechanical component(s). The transmission 60 may include at least one clutch 61. The clutch may be a disconnect clutch or a clutch for shifting between gears, for example. The clutch 61 in the transmission 60 may be operated via an actuator 63 (e.g., a shift fork actuator or other suitable actuator).

Further, the transmission 60 may output mechanical power to the differential 62. The output torque may be moderated via clutch operation in the transmission 60. Mechanical power from the differential 62 may in turn be transferred to axle shafts 66 which are rotationally coupled to drive wheels 55.

A controller 112 may form a portion of a control system 114. The control system 114 is shown receiving information from sensors 116 and sending control signals to actuators 118. As one example, the sensors 116 may include sensors such as a battery state of charge sensor, a clutch position sensor, a transmission input and/or output speed sensor, and the like. As another example, the actuators 118 may include a shift fork actuator for the clutch as well as actuator for other transmission and more generally vehicle components. The shift fork actuator may be configured to move the clutch 61 (e.g., a dog clutch or a synchronizer) into and out of engagement with one or more gears of the transmission 60. In other examples, the clutch may be a disconnect clutch. The controller 112 may receive input data from the sensors, process the input data via a processor, and trigger the actuators in response to the processed input data based on instructions programmed therein corresponding to one or more routines. In some examples, the controller 112 may include instructions that send commands to the actuator 63 to engage or disengage the clutch 61. An input device 120 (e.g., gear selector, mode selector, accelerator pedal, brake pedal, combinations thereof, and the like) may provide input to the controller 112 that represent an operator's intent for vehicle control.

FIGS. 1-8 include a coordinate system to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples.

Figure 2:
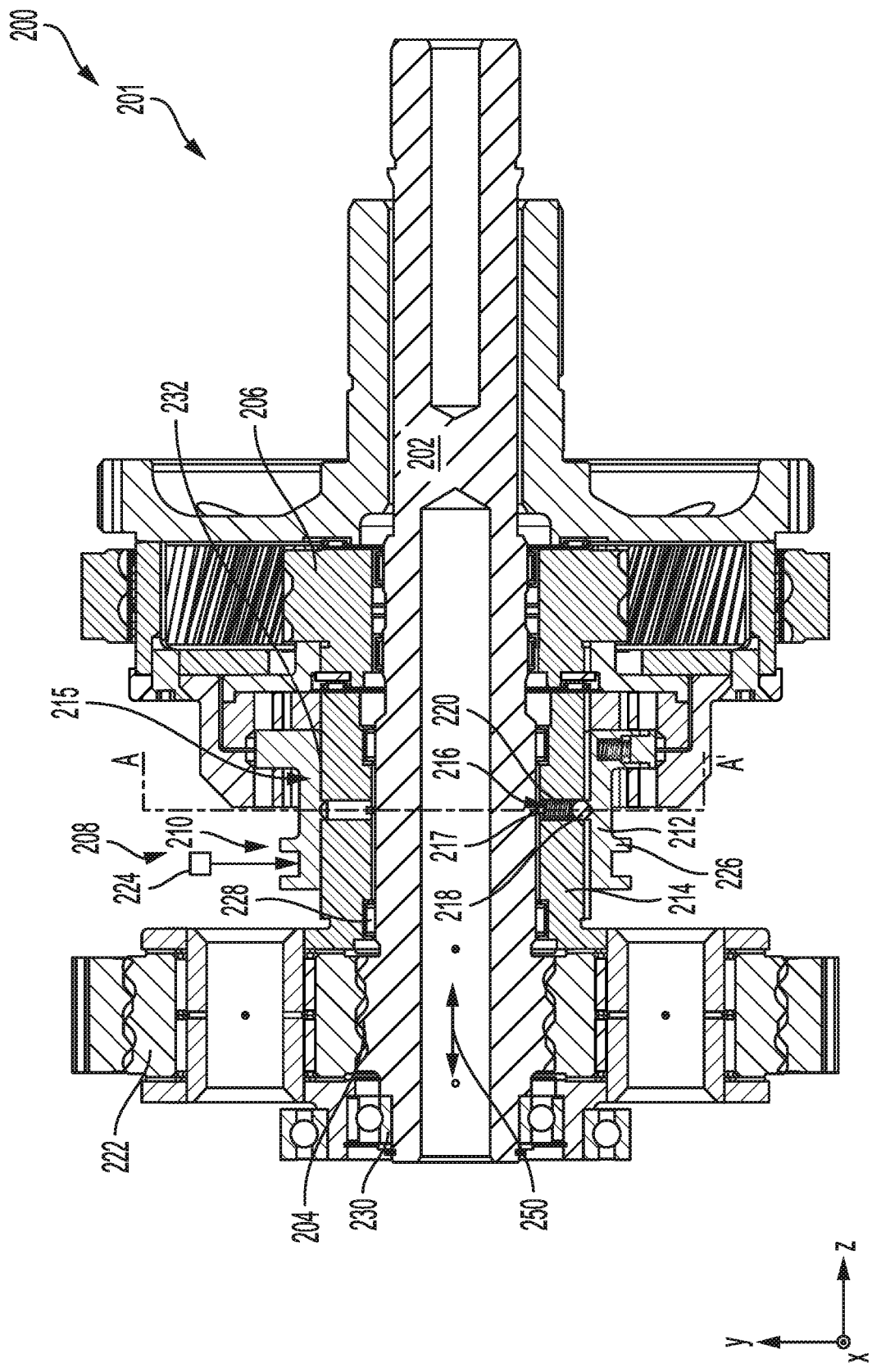
FIG. 2 shows a cross-sectional view of an example of a transmission with a clutch that includes a detent assembly.

FIG. 2 shows a cross-section of an example of a transmission 200 and a transmission system 201. The transmission 200 is an example of the transmission 60 depicted in FIG. 1. Therefore, the components in the transmission 200 may be included in the transmission 60 and vice versa. Further, the transmission 200 may be included in a vehicle such as the vehicle 50, shown in FIG. 1.

The transmission system 201 includes a shaft 202 with a gear 204 fixedly coupled thereto or formed therewith, a gear 206 idly mounted thereto, and a clutch 208 with a clutch assembly 210. The clutch 208 is specifically illustrated as dog clutch. However, the clutch may take another suitable form, in other examples. For instance, the clutch may be a synchronizer, in another example. In the illustrated example, the clutch 208 is positioned axially between the gear 204 and the gear 206. However, a variety of transmission layouts with the gears and the clutch positioned in alternate arrangements have been contemplated.

The clutch 208 includes the clutch assembly 210 with a sleeve 212 that at least partially circumferentially surrounding a hub 214. The hub 214 includes a detent assembly 215 with openings 216 (e.g., through holes) in which balls 218 and springs 220 are positioned. To elaborate, the springs 220 may be pre-compressed such that they exert a radially outward force on the balls 218. In this way, the sleeve 212 may be held in a desired position with regard to the hub 214. Additionally, the springs 220 are illustrated as helical springs. However, other types of springs may be used such as wave springs, in alternate examples. The clutch assembly 210 is configured to engage and disengage based on a position (e.g., an axial position) of the sleeve.

The detent assembly 215 is configured to hold the sleeve 212 and the hub 214 in a defined axial position with regard to the sleeve 212. To elaborate, the detent assembly 215 is configured to retain the sleeve 212 in a neutral position where the clutch is not engaged with a gear or other suitable component in the transmission 200. When the clutch 208 is transitioned between engagement and disengagement, the sleeve 212 axially translates with regard to the-hub 214. The detent assembly 215 further includes a retaining device 217 which is a circlip, in the illustrated example. However, in alternate examples the retaining device may be a bushing (e.g., a press-fit bushing) or other suitable device. The embodiment of the detent assembly with the bushing is expanded upon herein with regard to FIG. 8. The retaining device 217 holds the springs 220 and the balls 218 in the openings 216, thereby reducing the chance of the balls and springs being misplaced during manufacturing, thereby increasing the manufacturing efficiency of the transmission.

The transmission 200 includes gears which may mesh with upstream and/or downstream components. To elaborate, the gear 204 may be coupled to or formed with the shaft 202. The gear 204 may mesh with a gear 222. The gear 206 may be idly mounted to the shaft 202.

The clutch 208 is configured to be engaged and disengaged. To elaborate, the clutch 208 may be configured to, in an engaged configuration, transfer mechanical power between the gear 204 and the gear 206. In one example, the transmission may include two epicyclic units placed in series. The input of the transmission may be through the shaft 202 that, with the gear 204 (e.g., a pinion gear), is the input of the first epicyclic unit (on the left side of the transmission in the frame of reference depicted in FIG. 2). The output of the first epicyclic unit is its carrier where the hub of the clutch 214 is arranged. The clutch may receive the motion from the carrier of the first epicyclic unit and gives it to the second epicyclic unit (on the right side of the transmission in the frame of reference depicted in FIG. 2). If the clutch is engaged leftwards, it may connect directly the carrier of the first epicyclic unit to the carrier of the second epicyclic unit (that functions as the output of the transmission, in some cases). Consequently, the second epicyclic unit may not work as a reduction unit but it works with a 1:1 ratio. If the clutch is engaged rightwards, it may connect the carrier of the first epicyclic unit to the gear 206 of the second epicyclic unit. Consequently, the second epicyclic unit works as a reduction unit. However, the clutch 208 may be configured to engage and disengage different gears or other suitable components in the transmission. More generally, the clutch may be configured to permit and inhibit power transfer between two transmission system components. To elaborate, the clutch 208 may be configured to engage gears for speed change functionality, in one example, or may be configured with disconnect functionality where, for example, mechanical power at the output or input of the transmission is selectively discontinued.

An actuator 224 (e.g., a shift fork or other suitable actuation device) is configured to induce axial translation of the sleeve 212 with regard to the hub 214. To elaborate, the actuator 224 may be a shift fork that mates with an actuator interface 226 (e.g., shift fork interface) in the sleeve 212 to axially adjust the sleeve. The actuator 224 may be hydraulically actuated, mechanically actuated, electrically actuated, pneumatically actuated, combinations thereof, and the like.

Bearings 228 may be positioned between the hub 214 and the shaft 202. Thus, the hub 214 may be idly mounted on the shaft 202. Further, a bearing 230 may be coupled to the shaft 202. As described herein, a bearing supports, constrains movement, and permits rotation of the component which it is attached to. As such, a bearing as described herein may include an outer race, an inner race, and rolling elements (e.g., cylindrical rollers, balls, tapered rollers, needle rollers, and the like) which are positioned between the races.

A splined interface 232 between the sleeve 212 and the hub 214 are further depicted in FIG. 2. The splined interface 232 includes splines in an inner diameter of the sleeve 212 and splines in an outer diameter of the hub 214. In this way, the hub and the sleeve are able to axially translate with regard to one another while torque is transferred therebetween.

A rotational axis 250 of the shaft 202 is provided for reference in FIG. 2. The cutting plane for the cross-sectional view depicted in FIG. 2 extends through the rotational axis 250. Cutting plane A-A' defines the cross-sectional view depicted in FIG. 3. The rotational axis 250 is also provided in FIGS. 3-8 for reference, when appropriate. The cutting plane for the cross-sectional view depicted in FIG. 2 as well as FIGS. 5, 7, and 8 extend through the rotational axis 250.

Figure 3:
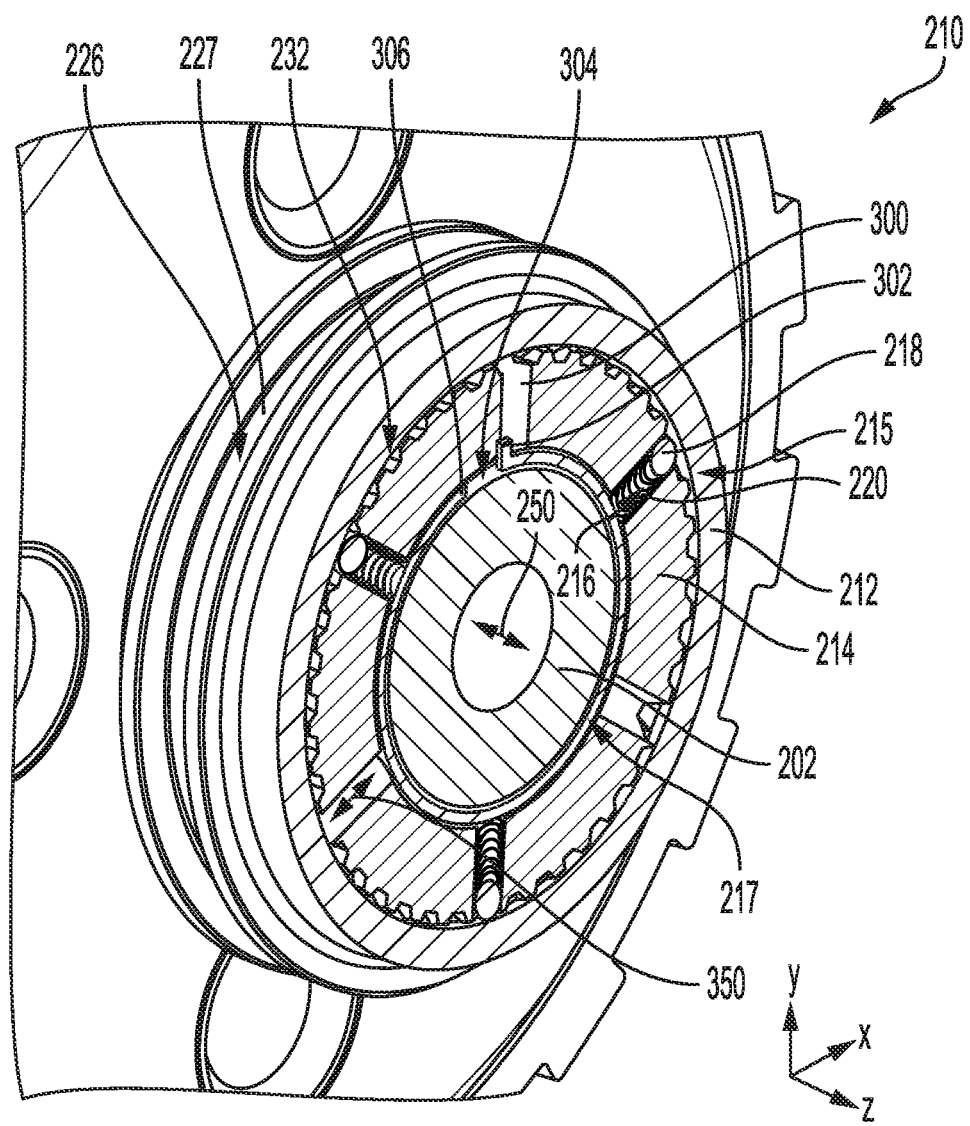
FIGS. 3 and 4 show cross-sectional views of the detent assembly, depicted in FIG. 2.

FIG. 3 shows a cross-sectional view of the clutch assembly 210 with the hub 214, the sleeve 212, the detent assembly 215, and the shaft 202. The balls 218 and the springs 220 in the detent assembly 215 are further depicted in FIG. 3 along with the openings 216 in which the balls and springs are mated. The hub may further include openings 300 which do not include springs and balls. One of the openings 300 may have a tab 302 of the circlip 217 mated therewith the constrain movement of the circlip. In this way, the circlip may be retained in a desired position. The openings 300 may enable the hub to be more efficiently manufactured. To elaborate, the openings 300 and the openings 216 may be symmetrically positioned about the axis 250. To elaborate, in one specific example, the openings 216 with the springs 220 and the balls 218 positioned therein may be spaced apart by 120°. Thus, the central axes 350 of opposing openings may be aligned to enable the openings to be effectively machined or otherwise formed in the hub. Therefore, in such an example, the openings for the balls and springs and the empty opening may be more efficiently machined or otherwise constructed.

As shown, the circlip 217 is positioned between the shaft 202 and the hub 214 at inner and outer diameter respectively. Further, as previously discussed, one or more bearings (e.g., needle bearings) may be coupled to and positioned between the hub 214 and the shaft 202. A gap 304 may be formed between an end 306 of the circlip 217 and the circlip tab 302.

The splined interface 232 between the hub 214 and the sleeve 212 is further depicted. The actuator interface 226 (e.g., shift fork interface) in the sleeve 212 is further shown in FIG. 3. The actuation interface 226 includes a recess 227 that is contoured to mate with a shift fork or other suitable actuator.

Figure 4:
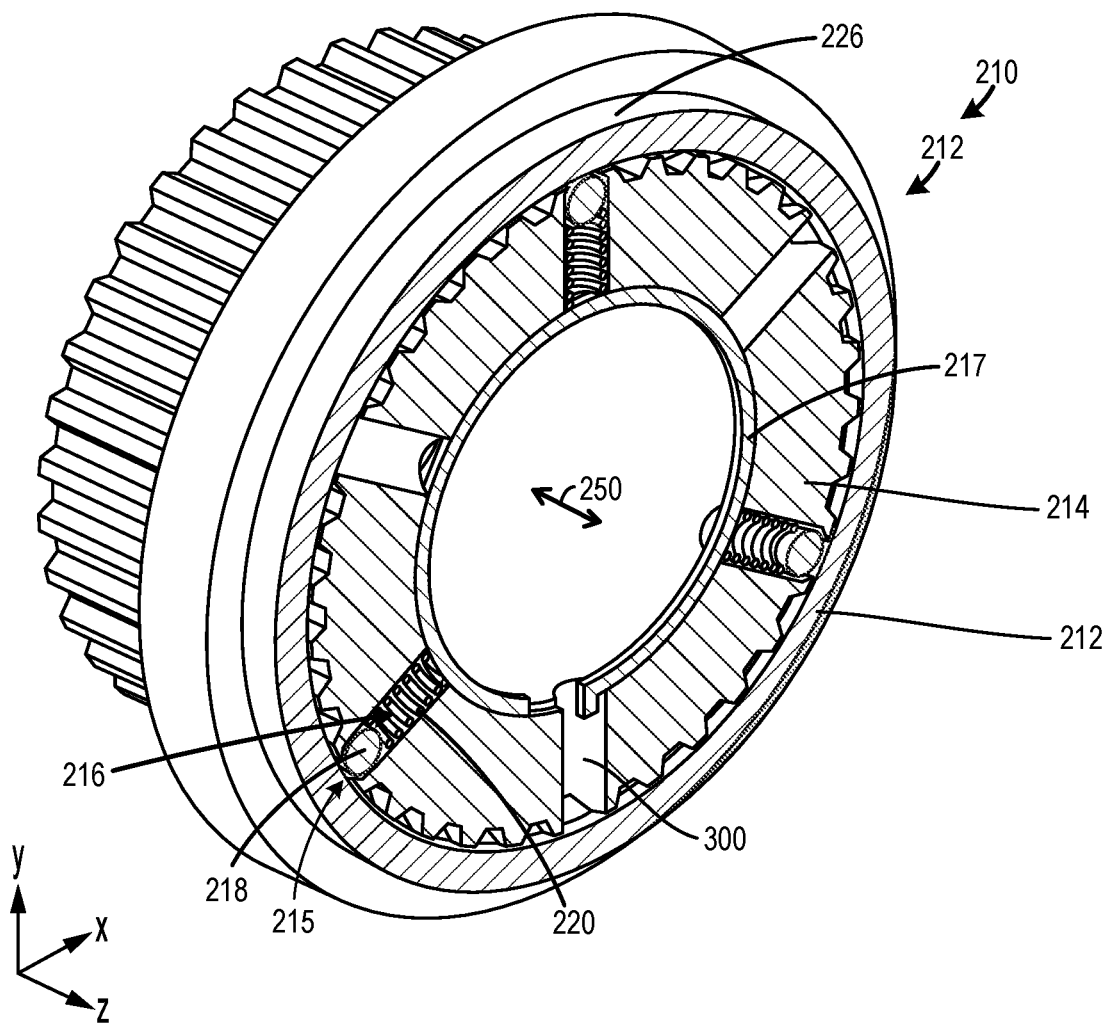

FIG. 4 shows another cross-sectional view of the clutch assembly 210 with the hub 214, the sleeve 212, and the detent assembly 215. The openings 216 with the balls 218 and the springs 220 positioned therein, the openings 300, and the circlip 217 in the detent assembly 215 are further depicted. The actuation interface 226 in the sleeve 212 is further illustrated in FIG. 4.

Figure 5:
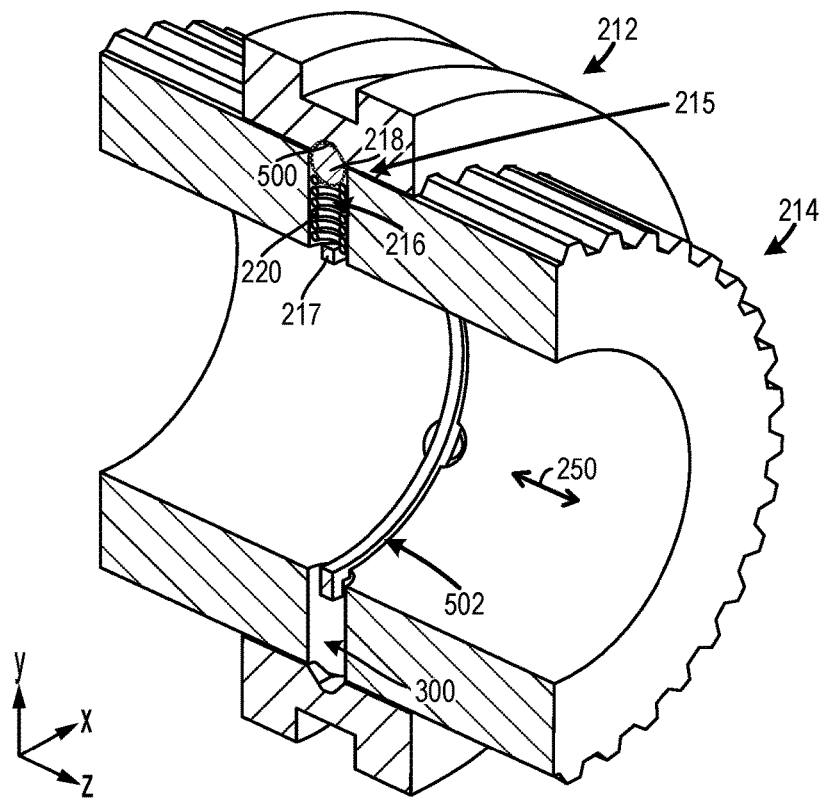
FIG. 5 shows another cross-sectional view of the clutch, depicted in FIG. 2.

FIG. 5 shows another cross-sectional view of the detent assembly 215. The openings 216 with the springs 220 and balls 218 positioned therein, the opening 300, and the circlip 217 are again depicted. The hub 214 and the sleeve 212 are further depicted in FIG. 5. The balls 218 are shown mating with detents 500. The springs 220 due to their pre-compression hold the balls in the sleeve detents. The hub 214 may include a circlip recess 502, that allows at least a portion of the circlip to mate therewith. The circlip recess may circumferentially extend around at least a portion of the inner diameter of the hub. However, in other examples, the circlip recess may be omitted from the hub.

Figure 6:
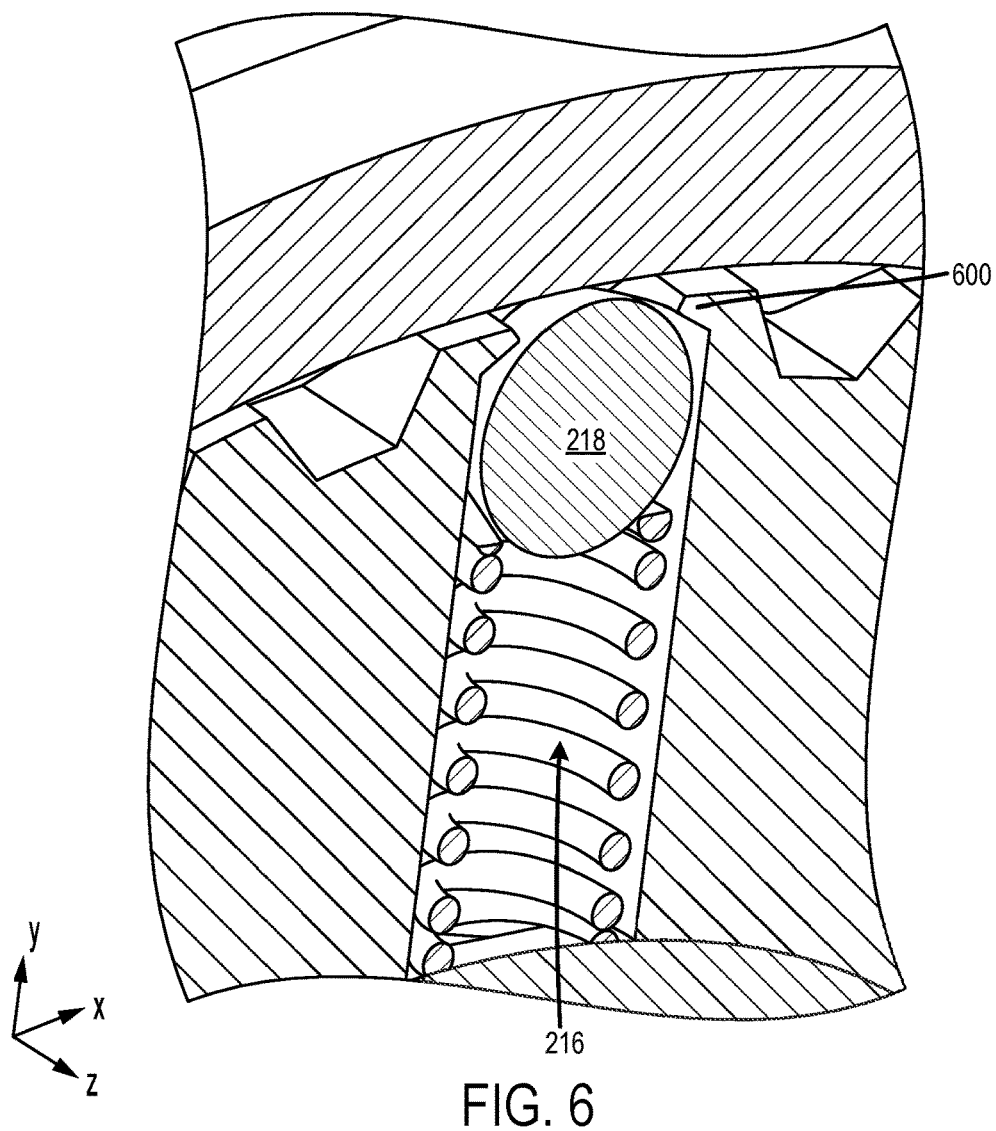
FIGS. 6 and 7 show detailed views of a spring and a ball in the detent assembly, depicted in FIG. 2.

FIG. 6 shows a detailed view of the detent assembly 215. The openings 216 are shown including lips 600 that radially delimits the balls 218. The lips may be positioned on an outer side of the hub 214. In this way, the ball may move in a desired manner during clutch operation. The lips allow for efficient pre-assembled inside the hub without the sleeve, if desired. Therefore, the sleeve may be assembled later when it may be more convenient for the transmission assembling. The lips may be created by manufacturing the hole from the opposite side. As such, there may be holes without springs and balls. Furthermore, balls and springs may be assembled from the inside of the shaft and may be kept in position by the circlip.

Figure 7:
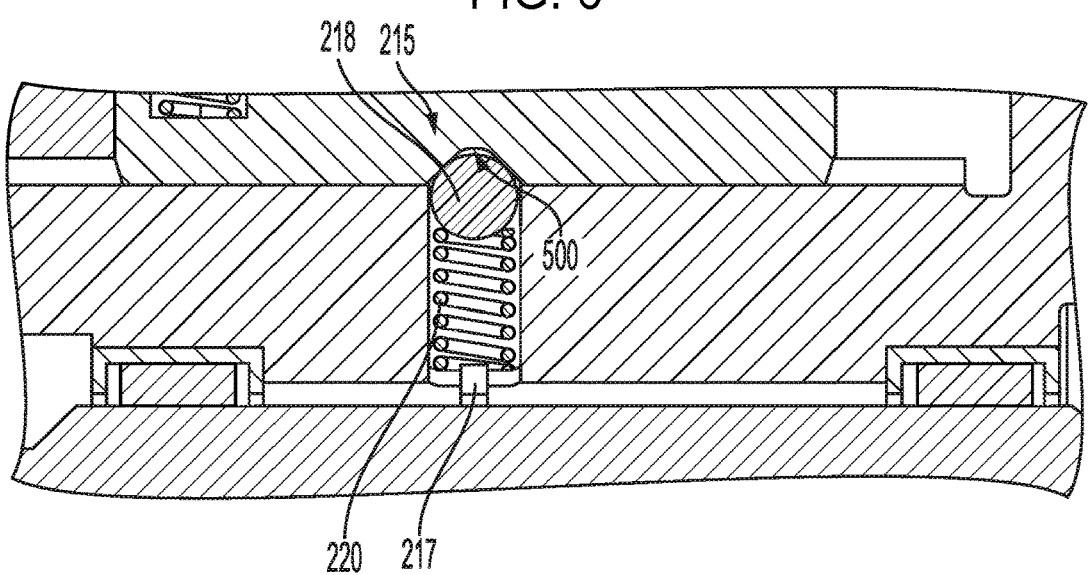

FIG. 7 shows another detailed view of the detent assembly 215. The balls 218 are shown mated with the detents 500 in the sleeve 212 and the springs 220 which may be preloaded allows the balls to be retained in mating engagement with the detent. Further, the circlip 217 retains the springs 220 in the opening 216.

During assembly, the balls and springs may be positioned in the hub from the inside. Subsequently, a circlip or bushing may be coupled to the hub to retain the springs and balls therein. The sleeve may be assembled at a later time during transmission assembly.

Figure 8:
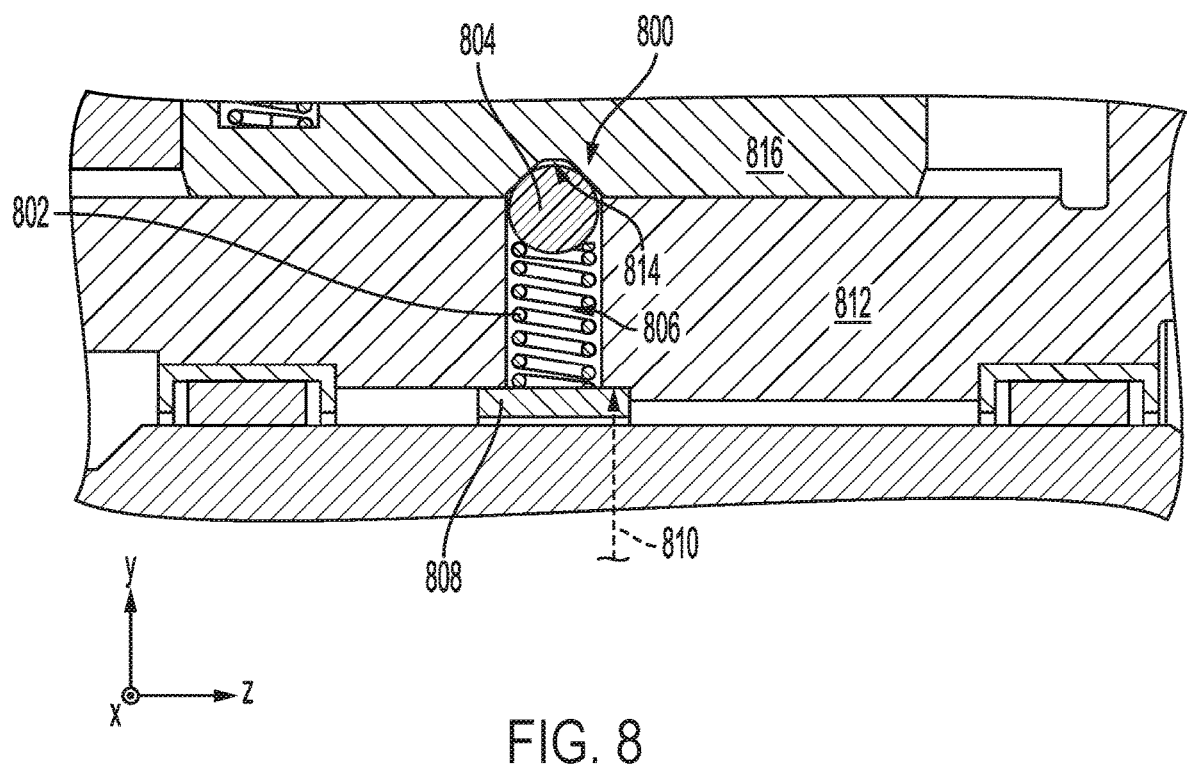
FIG. 8 shows another example of a detent assembly in a clutch.

FIG. 8 shows another example of a detent assembly 800. The detent assembly 800 includes some overlapping components with the detent assembly 215, depicted in FIGS. 2-7, such as springs 802, balls 804, openings 806, etc. Redundant description of the overlapping features, components, and the like is omitted for brevity. A bushing 808 is provided in the detent assembly 800 as a retaining device as opposed to the circlip shown in FIGS. 2-7. The bushing 808 illustrated in FIG. 8 may be press-fit to an inner diameter 810 of a hub 812. In this way, the springs 802 may be effectively retained in the openings 806. To elaborate, the springs 802 may be compressed and retained in the opening 806 such that the spring is urged radially outward into a detent 814 in a sleeve 816. The bushing allows the clutch assembly to be pre-assembled as a unit and then efficiently installed on a shaft, if desired.

FIGS. 1-8 provide for an installation method where the detent assembly is installed on the shaft as an assembled unit. The technical effect of this installation method is to increase manufacturing efficiency. FIGS. 1-8 also provide for a method where the clutch which includes the detent assembly is adjusted (e.g., engaged and disengaged). The technical effect of these methods is to increase manufacturing efficiency of the transmission in which the clutch is utilized and confidently shift between transmission gear modes, respectively.

FIGS. 2-8 are drawn approximately to scale, aside from the schematically depicted components. However, the components may have alternate dimensions in alternate embodiments.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a clutch assembly is provided that comprises a sleeve that is configured to at least partially circumferentially surrounds a hub; a detent assembly positioned in the hub, configured to hold the sleeve and the hub in a defined axial position, and including: a first opening with a ball and a spring positioned therein; and a retaining device that maintains the spring and the ball in the first opening; wherein the ball mates with a detent in the sleeve. Further in one example, the retaining device may be a circlip. Further, in one example, the circlip may include a tab configured to constrain rotation of the circlip. Still further in one example, the tab may mate with a second opening. In another example, the first opening may be a through hole. In yet another example, the retaining device may be a bushing. In another example, the bushing may be press-fit into the hub. In one example, the clutch assembly may be included in a dog clutch. In another example, the sleeve may include a shift fork interface. In another example, the recess may include a lip that radially delimits the ball. In another example, the detent assembly may include a plurality of openings which each include a ball and spring positioned therein. In yet another example, the plurality of openings may be symmetrically spaced apart with regard to a central axis of the clutch assembly.

In another aspect, a method for operation of a clutch is provided that comprises adjusting the clutch; wherein the clutch includes a clutch assembly that comprises: a sleeve that at least partially circumferentially surrounds a hub; a detent assembly positioned in the hub, configured to hold the sleeve and the hub in a defined axial position, and including: an opening with a ball and a spring positioned therein; and a retaining device that maintains the spring in the openings; wherein the ball mates with a detent in the sleeve. In one example, adjusting the clutch system may include sliding the hub into mated engagement with a gear.

In yet another aspect, a dog clutch assembly is provided that comprises a sleeve that at least partially circumferentially surrounds a hub; a detent assembly positioned in the hub, configured to hold the sleeve and the hub in a defined axial position, and including: a first through hole with a ball and a spring positioned therein; and a circlip or a bushing that maintains the spring the first through hole; wherein the ball mates with a detent in the sleeve. In one example, the circlip may include a tab that mates with a second through hole and constrains rotation of the circlip, wherein the second through hole does not includes a ball or a spring. In another example, the detent assembly may include a second through hole and a third through hole which include balls and springs positioned therein. Still further, in another example, the first through hole, the second through hole, and the third through hole may be sequentially spaced apart by 120° with regard to a central axis. Further, in one example, the dog clutch assembly may be included in a transmission. Still further, in one example, the transmission may be an electric transmission.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A clutch assembly, comprising:
   a sleeve that is configured to at least partially circumferentially surround a hub; and
   a detent assembly positioned in the hub, configured to hold the sleeve and the hub in a defined axial position, and including:
     a first opening with a ball and a spring positioned therein; and
     at least one of a circlip and a bushing that maintains the spring and the ball in the first opening;
   wherein the ball mates with a detent in the sleeve.

2. The clutch assembly of claim 1, wherein the circlip includes a tab configured to constrain rotation of the circlip.

3. The clutch assembly of claim 2, wherein the tab mates with a second opening.

4. The clutch assembly of claim 1, wherein the first opening is a through hole.

5. The clutch assembly of claim 1, wherein the bushing is press-fit into the hub.

6. The clutch assembly of claim 1, wherein the clutch assembly is included in a dog clutch.

7. The clutch assembly of claim 6, wherein the sleeve includes a shift fork interface.

8. The clutch assembly of claim 1, wherein the first opening includes a lip that radially delimits the ball.

9. The clutch assembly of claim 1, wherein the detent assembly includes a plurality of openings which each include a ball and spring positioned therein.

10. The clutch assembly of claim 9, wherein the plurality of openings are symmetrically spaced apart with regard to a central axis of the clutch assembly.

11. A dog clutch assembly, comprising:
   a sleeve that at least partially circumferentially surrounds a hub;
   a detent assembly positioned in the hub, configured to hold the sleeve and the hub in a defined axial position, and including:
     a first through hole with a ball and a spring positioned therein; and
     a circlip or a bushing that maintains the spring in the first through hole;
   wherein the ball mates with a detent in the sleeve.

12. The dog clutch assembly of claim 11, wherein the circlip includes a tab that mates with a second through hole and constrains rotation of the circlip, and wherein the second through hole does not include a ball or a spring.

13. The dog clutch assembly of claim 11, wherein the detent assembly includes a second through hole and a third through hole which include balls and springs positioned therein.

14. The dog clutch assembly of claim 13, wherein the first through hole, the second through hole, and the third through hole are sequentially spaced apart by 120° with regard to a central axis.

15. The dog clutch assembly of claim 11, wherein the dog clutch assembly is included in a transmission.

16. The dog clutch assembly of claim 15, wherein the transmission is an electric transmission.

\* \* \* \* \*